United States Patent Office 3,477,952
Patented Nov. 11, 1969

3,477,952
AZEOTROPIC COMPOSITION
Albert W. Bauer, Wilmington, and Robert A. Gorski, Newark, Del., assignors to E. I. du Pont de Nemours and Company, Wilmington, Del., a corporation of Delaware
No Drawing. Filed July 1, 1966, Ser. No. 562,133
Int. Cl. C23g 5/02; B01d 3/36
U.S. Cl. 252—171         4 Claims

ABSTRACT OF THE DISCLOSURE

An azeotropic mixture of 98 to 96.5% by weight trichlorofluoromethane and 2% to 3.5% by weight methanol which is useful in removing contaminants from surfaces such as films.

---

The present invention is directed to a novel cleaning solvent composition. More particularly, the present invention is directed to a cleaning solvent composition particularly suited for cleaning materials such as plastic tapes and films.

The cleaning of sensitive materials, such as plastic tapes and films used in the fields of electronic recording, packaging, and cinematography fields, has become increasingly important as these fields have developed commercially. It is known that tapes and films used in such fields are required to be clean and free from particulate matter before being coated with other materials. This requirement is well known, for example, in the manufacture of photographic film. However, the efficient cleaning of these sensitive tapes and films has been extremely difficult since, in order to clean large quantities of tapes and films economically, it is necesary that the tapes or films be passed at a rapid rate, e.g., up to 1,000 ft./min., through the cleaning solvent or through the vapors of the solvent. It is a requirement in such high-speed processes that the solvent be evaporated rapidly from the cleaned surface without recourse to high drying temperatures, and that the tape or film be wound up in the dry state in a continuous manner. Moreover, the solvent cleaning of some tapes is difficult, since due to their temperature sensitivity they cannot be brought to elevated temperatures for quick drying or passed through the vapors of solvents boiling at elevated temperatures.

The cleaning solvent must, therefore, be low boiling and have a low heat of vaporization so that the cleaning solvent will evaporate rapidly from the cleaned surface. Trichlorofluoromethane meets the requirements of rapid evaporation without resort to high drying temperatures and is a mild, low-boiling (23.77° C. at atmospheric pressure) solvent. However, trichlorofluoromethane has other disadvantages which make it unsatisfactory for these applications.

Trichlorofluoromethane alone does not effectively remove particulate matter from electrically non-conducting films and tapes because particulate matter, such as dust, is generally held to the tape or film substrate by electrostatic forces which trichlorofluoromethane, due to its low degree of electrical conductivity, is unable to dissipate. Further, when tapes and films of dielectric materials are passed at high speeds through electrically non-conducting or very weakly conducting fluids, strong electrostatic charges are known to build up which can lead to spark discharges. Such spark discharges can damage the tape or film.

Furthermore, in the rapid evaporation of a liquid such as trichlorofluoromethane, the temperature of the substrate from which it evaporates is frequently lowered below the dew point of the surrounding atmosphere. Moisture from the surrounding air, therefore, condenses on the substrate and often is frozen forming ice particles. The formation of ice particles on tapes and films is undesirable and often mechanically damages the film and tapes on windup.

Other solvents for one reason or another fail to be effective in the cleaning of these tapes and films under the required low temperatures. For example, methanol, the alcohol having the lowest boiling point of all alcohols, has a considerably higher boiling point than does trichlorofluoromethane (64.7° C. versus 23.8° C.) and is, therefore, useless in this cleaning application where temperature sensitive films are involved. Moreover, the rate of vaporization of trichlorofluoromethane is about 4.5 times that of methanol [see Scheflan and Jacobs, The Handbook of Solvents, Van Nostrand, New York (1953) p. 39 et seq.] and the heat of vaporization of methanol is about 6.5 times as great as that of trichlorofluoromethane (284.3 gram-calories per gram at 15° C. for methanol versus 43.51 gram calories per gram at 23.8° C. for $CCl_3F$). Thus, methanol also fails as a solvent in high speed tape cleaning operations due to its slow rate of evaporation. Methanol is also quite flammable and precautions must be taken to avoid fire and explosion.

Combining trichlorofluoromethane with other organic solvents in order to improve the electrical conductivity of the solvent has not been successful in the past, since its combination with other materials usually destroys one or more of the family of good properties which make trichlorofluoromethane a useful solvent for this purpose. Moreover, it is most important that a solvent mixture have the same composition in both the liquid and vapor phases if it is to operate in the cleaning process, since the vapor phase rinsing and solvent recovery procedures depend on constant composition in the vapor and liquid phases. In this respect most solvent mixtures containing trichlorofluoromethane are unsatisfactory since they fractionate upon evaporation.

There is, therefore, a real need for a low-boiling, fast drying, non-flammable, non-icing, electrically conductive solvent of constant composition throughout its evaporation cycle for use in the process of cleaning plastic tapes and films. It is to this need that the cleaning composition of this invention is directed.

More specifically, the present invention is directed to a novel azeotropic composition consisting of from about 98% to about 96.5% by weight of trichlorofluoromethane and from 2% to 3.5% by weight of methanol. The true azeotrope boils at 21.63° C. at 760 mm. of mercury pressure. Compositions containing from 2% to 3.5% by weight methanol and 98% to 96.5% by weight trichlorofluoromethane have essentially the same boiling point and do not fractionate to any appreciable extent on evaporation.

An azeotrope is a liquid mixture that exhibits a maximum or minimum boiling point. Characteristic of an azetropic mixture is the fact that its distillate has the same composition as the original mixture and, hence, no change in properties of the mixture or the distillate occurs as a result of evaporation. It is well established that the existence of an azeotrope is entirely unpredictable.

The existence of a minimum boiling azeotrope containing about 3% by weight of methanol and 97% by weight of trichlorofluoromethane is demonstrated by measurement of the boiling points of various mixtures of trichlorofluoromethane and methanol. The following table shows the results of these measurements and the existence of the minimum boiling azeotropic mixture.

TABLE I

Boiling points of trichlorofluoromethane-methanol mixtures

| Wt. percent methanol | Boiling point (° C.) (atmospheric pressure) |
|---|---|
| 0 | 23.77 |
| 1 | 21.74 |
| 2 | 21.64 |
| 3 | 21.63 |
| 3.5 | 21.64 |
| 4 | 21.65 |
| 5 | 21.68 |
| 10 | 21.76 |
| 25 | 21.90 |
| 100 | 64.72 |

The minimum boiling azeotropic composition of this invention is particularly suited for use as a solvent in the process of cleaning plastic tapes and films at low temperatures. First of all, the azeotropic mixture is low boiling, boiling at 21.63° C., at 760 mm. Hg pressure, and thus evaporates more rapidly than trichlorofluoromethane. Secondly, being an azeotrope, the solvent has a constant composition throughout its evaporation cycle and, therefore, is easily recovered having the same composition as the original mixture. Also, the vapor phase rinsing step is successful since the composition in the vapor phase is the same as the original cleaning solvent.

Moreover, the azeotropic composition of this invention does not permit the formation of ice on the films or tapes under conditions of free evaporation since the methanol acts to lower the freezing point of the moisture condensate. As hereinabove stated, ice is a serious disadvantage in the use of pure trichlorofluoromethane in this cleaning process. The incorporation of from about 2% by weight of methanol and above into trichlorofluoromethane causes an increase in electrical conductivity of some 800 times over that of trichlorofluoromethane alone. This property markedly reduces static charge buildup which simplifies cleaning and minimizes electrical arcing and the problems associated with strong charges on dielectric materials during windup. Finally, mixtures containing up to 3.5% by weight of the methanol are not flammable and, therefore, can be safely used in processes for cleaning plastic tapes and films.

The azetrope-like character of the solvent mixture of the present invention provides an unusually attractive solvent from an economic point of view. Naturally, it is important that the recovery process used to rid the solvent of accumulated contaminants be such that the composition of the solvent after removal of the contaminants be the same as the original mixture. Since the composition of the present invention possesses azeotropic characteristics, ridding the solvent of the accumulation is quite easily accomplished by simple distillation. Because of the solvent mixture's azeotropic nature, the condensed solvent will have the same composition and properties as the original mixture.

Representative examples of the plastic tapes and films which are cleaned by the azeotropic composition of this invention are those made from cellulose acetate, cellulose triacetate, ethyl cellulose, polyamides, polymethylmethacrylate, polyethylene, polypropylene, and polyesters, including polyethylene terephthalate and polyvinyl chloride-acetate.

Representative examples illustrating and characterizing the present invention follow. All parts are by weight unless otherwise specified:

EXAMPLE 1

Non-flammability of azeotropic mixture

A simple, reliable test for flammability of evaporating liquids consists in allowing from 2 to 3 milliliters of the liquid to be tested to evaporate freely into the air from a 10 cm. watch-glass in the presence of an ignition source. If the vapors flame, the mixture is considered flammable. The test is best carried out in a dark room in order to be sure of seeing the burning of the vapors. In the following table are shown the results of a series of experiments of this kind carried out on various mixtures of trichlorofluoromethane and methanol.

TABLE II.—FLAMMABILITY OF MIXTURES OF TRICHLOROFLUOROMETHANE AND METHANOL

| Weight percent methanol | Wt. percent trichlorofluoromethane | Flammable |
|---|---|---|
| 100 | 0 | Yes |
| 10 | 90 | Yes |
| 5 | 95 | Yes |
| 4 | 96 | Yes |
| 3.5 | 96.5 | No |
| 3 | 97 | No |
| 1 | 99 | No |

EXAMPLE 2

Non-icing characteristics of azeotropic mixture

A 2- to 5-milliliter sample of pure trichlorofluoromethane was placed in a 10 cm. watchglass on a laboratory bench and the liquid was allowed freely to evaporate at room temperature into 50% to 70% relative humidity air. Ice crystals were observed to form in the watchglass. When mixtures of trichlorofluoromethane containing 1% by weight or more of methanol were allowed to evaporate in a similar manner, no ice crystals were observed.

EXAMPLE 3

Electrical conductivity of azeotropic mixture

The electrical conductivities of various mixtures of trichlorofluoromethane and methanol were measured using test method D–257–61 of the ASTM. The results of five such tests are shown in the following table.

TABLE III

Conductivity of mixtures of trichlorofluoromethane and methanol

| Concentration of methanol in wt. percent in $CCl_3F$ | Conductivities (ohm-cm.)$^{-1}$ |
|---|---|
| 0 | $2.5 \times 10^{-13}$ |
| 1 | $9 \times 10^{-11}$ |
| 2.0 | $1 \times 10^{-11}$ |
| 3.5 | $2 \times 10^{-10}$ |
| 100 | $8 \times 10^{-7}$ |

EXAMPLE 4

Cleaning plastic tapes with azeotropic mixture

A role of polyethylene terephthalate magnetic tape was charged with static electricity by rubbing rapidly with a wool cloth. The tape was then dusted with "Cab-O-Sil" collidal silica and room dust. Both adhered tightly to the charged tape. The contaminated tape was then passed through a slightly agitated bath of $CCl_3F$ cleaning solvent. Pure trichlorofluoromethane failed to remove more than 50% of the contamination. A mixture of 3% by weight of methanol and 97% by weight trichlorofluoromethane removed 98% of the dust and collidal silica. Since neither solvent would dissolve the silicous particles, the superior cleaning ability of the azeotropic mixture must have been physical in action, by dissipation of the static charges that held the particles on the tape.

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. An azeotropic mixture having a substantially constant boiling point at 21.63° C. at 760 mm. of mercury pressure and consisting essentially of
   (A) about 98% to 96.5% by weight trichlorofluoromethane and
   (B) about 2% to 3.5% by weight methanol.

2. A process for removing contaminants from the surfaces of materials which comprises contacting the surfaces of said materials with the azeotropic mixture of claim 1 and allowing said azeotropic mixture to evaporate from said surfaces.

3. A process for removing contaminants from the surfaces of plastic films and tapes which comprises contacting the surfaces of said films and tapes with the azeotropic mixture of claim 1 and allowing said azeotropic mixture to evaporate from said surfaces.

4. An azeotrope consisting of 97% by weight trichlorofluoromethane and 3% by weight methanol.

References Cited

UNITED STATES PATENTS

| 2,999,816 | 9/1961 | Bennett et al. | 252—171 |
| 3,085,116 | 4/1963 | Kvalnes | 260—652.5 |

LEON D. ROSDOL, Primary Examiner

W. SCHULZ, Assistant Examiner

U.S. Cl. X.R.

134—40; 203—66, 67; 252—170, 69, 364